United States Patent [19]

Bacon

[11] Patent Number: 4,689,531

[45] Date of Patent: Aug. 25, 1987

[54] ELECTRIC REGENERATION APPARATUS AND METHOD FOR DRIVING A LOAD

[75] Inventor: Jimmy R. Bacon, San Juan, Tex.

[73] Assignee: Ewers, and Willis, McAllen, Tex.

[21] Appl. No.: 750,584

[22] Filed: Jul. 1, 1985

[51] Int. Cl.$^4$ .............................................. H02J 7/14
[52] U.S. Cl. ................................... 318/139; 318/140; 320/8; 320/14; 320/21; 320/54
[58] Field of Search ............... 318/139, 140, 149, 150, 318/151, 152, 153, 154; 320/8, 9, 14, 19, 21, 28, 29, 31, 47, 49, 54; 322/88

[56] References Cited

U.S. PATENT DOCUMENTS

| | | | |
|---|---|---|---|
| 2,635,221 | 4/1953 | Harvey | 320/19 |
| 2,977,525 | 3/1961 | Medlar | 320/21 X |
| 3,367,438 | 2/1968 | Moore | 180/65.2 |
| 3,493,837 | 2/1970 | Sparks et al. | 320/29 |
| 3,845,835 | 11/1974 | Petit | 320/8 X |
| 3,909,685 | 9/1975 | Baker et al. | 318/139 |
| 3,917,017 | 11/1975 | Deane | 320/8 X |
| 3,921,050 | 11/1975 | Rowas | 320/21 X |
| 3,930,192 | 12/1975 | Dinkler | 320/21 X |
| 4,016,474 | 4/1977 | Mason | 320/21 X |
| 4,095,664 | 6/1978 | Bray | 318/149 X |
| 4,297,590 | 10/1981 | Vail | 318/139 X |
| 4,348,628 | 9/1982 | Loucks | 318/139 X |
| 4,360,766 | 11/1982 | Bogardus, Jr. | 318/139 |

FOREIGN PATENT DOCUMENTS 0536077 3/1952 Canada .................................. 320/19
0250613 4/1926 United Kingdom ................ 318/139

Primary Examiner—William M. Shoop, Jr.
Assistant Examiner—Bentsu Ro
Attorney, Agent, or Firm—Cushman, Darby & Cushman

[57] ABSTRACT

Apparatus and method providing electrical regeneration in an electrical vehicle. An electric drive motor drives the vehicle and is powered from a bank of drive battery packs. An electric recharge motor drives a plurality of generators to recharge all of the batteries. The recharge motor is powered from a bank of recharge battery packs. Drive battery packs are paired together with recharge battery packs. A timer switch opens and closes electrical contact between each pair of battery packs and its corresponding electric motor, one pair at a time. Thus, a drive battery pack powers the electric drive motor while a recharge battery pack powers the electric recharge motor. Non-connected battery packs are recharged by the plurality of generators. The timer switch sequentially switches through all pairs of battery packs in such a fashion that each pair of battery packs is recharged for a longer period of time than it is discharged.

40 Claims, 6 Drawing Figures

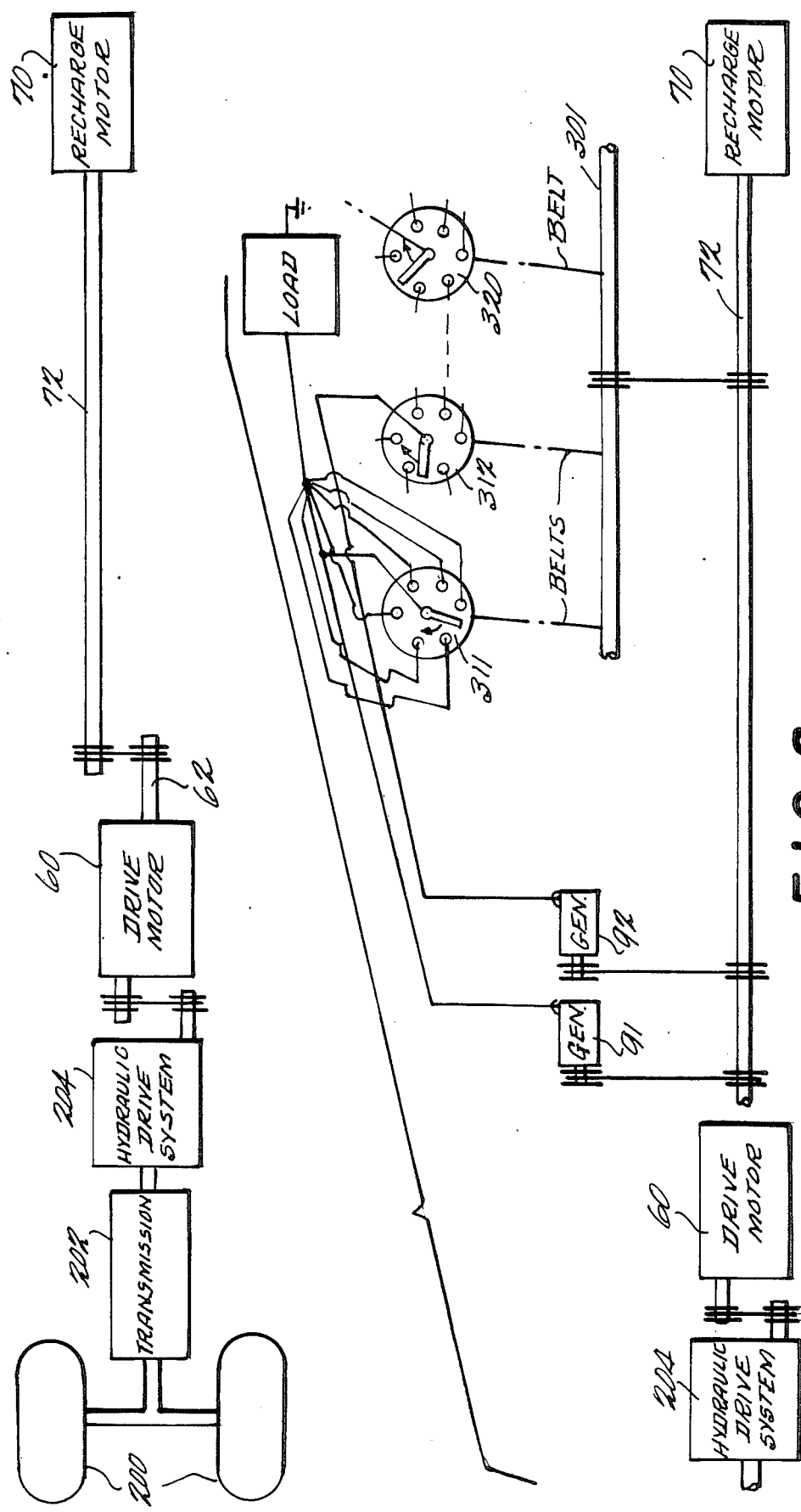

ELECTRIC REGENERATION APPARATUS AND METHOD FOR DRIVING A LOAD

BACKGROUND OF THE INVENTION

1. Field Of The Invention

This invention relates to electric regeneration apparatus for driving a load, and more particularly to a power-supply system having two electric motors and two banks of batteries for driving an electric vehicle.

2. Description Of The Prior Art

Considerable interest has been displayed over the years in designing an electric car which can be economically and reliably operated by the average consumer. Most known systems have the disadvantage that their operational range is limited due to the requirement of periodically recharging the batteries. By continually charging and discharging a battery, the battery life is reduced and its ability to be recharged effectively also suffers. Thus, by alternating a battery between a discharge and charge state, the batteries must be replaced periodically, thus increasing the cost of operating an electrical vehicle.

An additional problem with known electrical vehicles is that they are incapable of operating over long distances. By constantly alternating between a charge and a discharge state, each battery quickly is reduced to a condition where it cannot provide sufficient power to drive the vehicle. Solutions have been proposed to recharge the batteries while the vehicle is in operation. Such solutions include the provision of electric generators attached to the vehicle wheels so that excess drive force (for instance when the vehicle is moving downhill) may be converted into recharging power to recharge the batteries. However, such solutions are dependent upon the terrain over which the vehicle must operate and hence do not provide a reliable and predictable range for the electric vehicle.

At present, research is being performed to create new types of batteries in order to overcome inherent problems that presently exist in providing an electric power system for vehicles. However, to applicant's knowledge, there is no satisfactory system which allows an electrically operated vehicle to perform for substantially long periods of time over long distances.

Referring to FIG. 1, the charge/discharge method of operating known electrical vehicles is shown. In FIG. 1 it can be seen that the periods of discharge are equal in time to the periods of recharge. Such a charge/discharge method is known in the art as "deep cycling". Whenever the period of battery recharge is less than or equal to the period of battery discharge, such deep cycling occurs and is disadvantageous to the performance and life of the battery. It is known in the art that batteries are discharged faster than they can be recharged. Thus, each recharge cycle of FIG. 1 is incapable of returning the battery to its charge condition prior to the discharge phase. Thus, at the completion of each recharge phase, the charge state of the battery is progressively reduced. Such deep cycling rapidly reduces the life of the battery requiring costly replacement. An additional disadvantage of deep cycling is that the batteries are quickly reduced to a state where they are incapable of providing sufficient power to the vehicle and must be recharged. Thus, a major design factor is the requirement of most electrical vehicles to be recharged after relatively short periods of operation.

Many devices are known for powering electrical vehicles which attempt to overcome some of the problems described above. For example, U.S. Pat. No. 4,348,628 to Loucks discloses an electric motor alternating power supply for vehicles in which two batteries are provided which alternately drive the vehicle. A voltage sensor senses the charge condition of each battery and switches between the batteries depending upon their charge states. For recharging his batteries, Loucks provides alternators which presumably are powered by the vehicle drive shaft. One alternator is associated with each battery. However, Loucks' batteries are still subject to the deep cycling phenomenon depicted in FIG. 1. Thus, each battery is incapable of being recharged for a period of time greater than its being discharged. In addition, by coupling the alternators to the drive shaft, Loucks' recharging system is dependent upon the terrain over which the vehicle is operated. Plus, by switching between the batteries with a voltage sensor, a battery may be discharged after it has had an insufficient period of recharging so that permanent damage to the battery may be inflicted.

U.S. Pat. No. 4,297,590 to Vail discloses a power supply system in which three banks of batteries are provided to drive the load. Vail connects two of the battery banks to the load while the third battery bank is being recharged. Thus, for each battery, the period of discharge is longer than the period of recharge, thus reducing battery life and effectiveness. Vail attempts to minimize the deleterious effects of deep cycling by switching between the three battery banks after a given period of time. However, each battery will still discharge for a period of time longer than it will recharge.

U.S. Pat. No. 4,360,766 to Bogardus, Jr. discloses a multi-battery power supply for DC motors in which a plurality of batteries may be connected to the driving load depending upon need. Thus, batteries are connected to the load as required. However, a period of heavy demand on the batteries will require that all of them be connected in series, permitting none of them to be recharged for extended periods of time. Such a load-demand system places the battery life in jeopardy depending solely upon the power demanded by the load.

U.S. Pat. No. 3,845,835 to Petit discloses an electric power plant for an electric vehicle having two sets of batteries which are alternately charged and discharged. Switching between batteries is performed by a timer switch to insure that the batteries will not be drained if a heavy load condition exist (for example driving uphill) for a long period of time. Petit recharges his batteries with alternators which are connected to a vehicle axle. Therefore, the recharging energy available is restricted by the energy consumed by the vehicle during operation. The apparatus according to Petit is still subject to the deep cycle phenomenon discussed with reference to FIG. 1. Thus, a vehicle according to Petit will tend to require recharging after relatively short periods of operation, and the batteries will have to be replaced when they are no longer capable of being recharged to an operable state.

As can be appreciated from the above discussion, no known systems are designed to avoid the deep cycle phenomenon and to recharge the batteries with a recharging power which is not subject to the driving power demands of the vehicle or the terrain over which the vehicle operates.

SUMMARY OF THE INVENTION

It is an object of the present invention to overcome the problems of prior art devices, as discussed above. The present invention provides apparatus and method for driving a load in which each battery is recharged for a period of time longer than it is discharged to lengthen the battery life, and in which recharging of the batteries is not subject to the driving state of the vehicle or the terrain over which the vehicle operates.

The apparatus and method according to the present invention provides electric regeneration means for driving a load. A plurality of battery packs are provided and are divided into two battery banks. A first battery bank is connected to an electric drive motor to provide driving power. A second battery bank is connected to an electric recharge motor to provide recharge power to recharge all of the batteries. Each battery pack from the first battery bank is paired with corresponding battery pack from the second battery bank. Switching means are provided to connect, pair-by-pair, the battery packs to their respective electric motors. Thus, the switching means connects a first pair such that one battery pack is connected to the electric drive motor while the second battery pack is connected to the electric recharge motor. While this first pair is so connected, remaining pairs of battery packs are being recharged by individual generators coupled to the electric recharge motor.

After a given period of time, the switching means causes a second pair of battery packs to be connected to their respective electric motors while the first pair of battery packs is allowed to recharge. In such fashion, the switching means steps through all pairs of battery packs pair-by-pair and then returns to the first pair to repeat the operation over again.

Thus, by providing a plurality of pairs of battery packs, each battery pack may be recharged for a period of time longer than it is discharged.

By providing a separate electric recharge motor, recharging of the batteries is not subject to the drive state or the terrain over which the vehicle operates.

Preferably, the switching means is so arranged that a small period of overlap exists when switching from one pair of battery packs to another. Thus, for a small period of time two pairs of battery packs will be connected to their respective electric motors. Such a period of overlap allows for smooth transition between pairs of battery packs.

An additional accessory battery pack may be provided in order to drive the vehicle accessories.

A reserve battery pack may also be provided which may be used to replace a defective battery pack.

The characteristics and advantages of the invention are further sufficiently referred to in connection with the accompanying drawings, which represent one embodiment. After considering this example, skilled persons will understand that variations may be made without departing from the principles disclosed. Thus, the teachings of this invention may be employed in a variety of structures, arrangements, or modes of operation that are properly within the scope of the appended claims. It is to be understood that this invention is not directed toward a perpetual motion device. Rather, like all other electric vehicles, the batteries according to the present invention must be recharged from time to time.

BRIEF DESCRIPTION OF THE DRAWINGS

The advantageous features of the present invention will be more readily understood when described according to the following description of the presently preferred embodiment when taken together with the drawings in which:

FIG. 4 depicts an alternative arrangement of the present invention in which the drive and recharge motors are belted together;

FIG. 6 depicts an alternative embodiment of the present invention further including AC generating means for providing AC power.

DETAILED DESCRIPTION OF THE PRESENTLY PREFERRED EXEMPLARY EMBODIMENT

The present invention achieves its objectives by providing an apparatus and method of operating an electric motor vehicle which avoids the deep cycle phenomenon discussed above and thus lengthens the operational range and life of each battery. Two banks of battery packs are provided with a plurality of battery packs in each battery bank. At any one time, greater numbers of battery packs are being recharged than are being discharged. Thus, battery packs are subject to recharging for a longer period of time than they are discharged.

Figure 1:
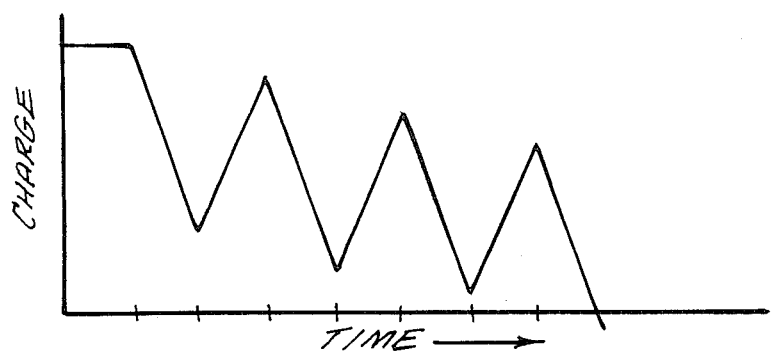
FIG. 1 depicts the "deep cycle" phenomenon associated with prior ar electric vehicles.
Figure 2:
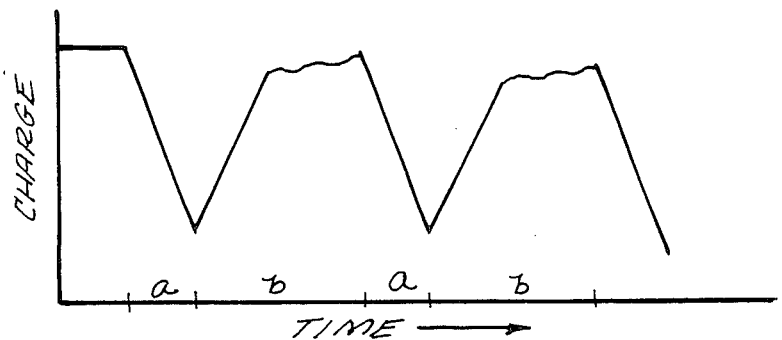
FIG. 2 depicts how the present invention avoids the "deep cycle" phenomenon.

Referring to FIG. 2, the principle of operation of the present invention may be readily understood. During time period a, a battery pack is connected to its corresponding electric motor and is discharged. During time period b, the battery pack is being recharged from the electric recharge motor. Since time period b is greater than time period a, the battery pack will be restored to very nearly its charge condition prior to being discharged. Thus, the battery pack will be capable of providing power for a longer period of time than was possible in the method disclosed in FIG. 1. In addition, by returning each battery pack to nearly its pre-discharged condition, the life time of each battery will be greatly extended. Thus, the present invention can extend the operating range of the vehicle before requiring recharge, and extend the life of the batteries thus reducing vehicle operational costs.

Figure 3:
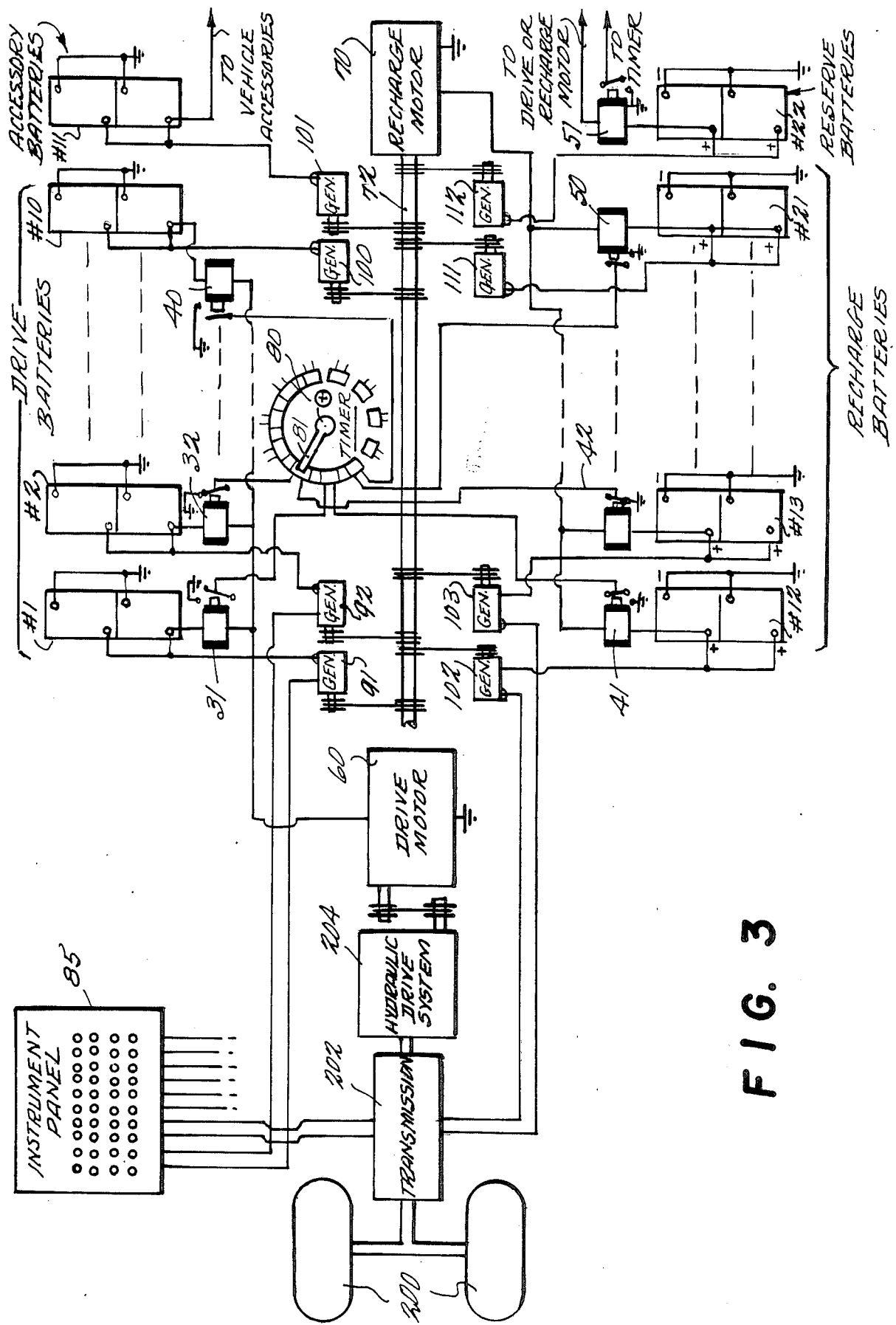
FIG. 3 depicts the presently preferred embodiment of the present invention.

Referring to FIG. 3, the presently preferred exemplary embodiment of the invention is shown mounted in an electrical vehicle. The vehicle is propelled by wheels 200 as driven by hydraulic drive system 204 through transmission 202. Hydraulic drive system 204 is propelled by electric drive motor 60 which is preferably a 500 Amp electric motor. Electric drive motor 60 is powered from a bank of drive batteries 1–10.

Each of drive batteries 1–10 preferably includes a battery pack comprising two twelve volt DC batteries of 650 Amps connected in series. Each battery pack 1–10 is connected to drive motor 60 by a relay 31–40, respectively. The relays 31–40 are controlled by timer switch 80. For recharging the batteries, electric recharge motor 70 powers a drive shaft 72 to which are belted a plurality of generators 91–112. Each of generators 91–100 is associated with one of the drive battery packs 1–10. Likewise, with each generator 102–111, is associated with a recharge battery pack 12–21. Each generator is preferably a 60 Amp generator. The belts may be constructed of molded plastic provide long life.

Electric recharge motor 70 derives its power from a bank of recharge batteries 12–21. Each of the recharge battery packs 12–21 may be connected to recharge motor 70 through a corresponding relay 41–50. The relays 41–50 are, likewise, controlled by timer switch 80.

Each of drive battery packs 1–10 is associated (paired) with a corresponding recharge battery pack 12–21. Thus, battery packs 1 and 12 are paired, 2 and 13 are paired . . . etc. In such a fashion, drive battery pack 1 is connected to drive motor 60 while recharge battery pack 12 is connected to recharge motor 70.

Timer switch 80 controls the relays in such a manner that one pair of battery packs is connected to the drive and recharge motors at any given time. While the connected pair of battery packs is providing drive and recharge power, the remaining battery packs are being recharged by the generators from the recharge motor 70. Timer switch 80 operates on a time basis sequentially switching on and off pairs of battery packs. As depicted in FIG. 3, drive battery pack 2 and recharge battery pack 13 are switched on by timer switch 80 and thus provide power to drive motor 60 and recharge motor 70, respectively. At this time, drive battery pack 1 and recharge battery pack 12 are being recharged by generators 91 and 102 respectively. Likewise, the remaining non-connected battery packs are being recharged at this time.

After a predetermined period of connected time, timer switch 80 will switch off drive battery pack 2 and recharge battery pack 13 and switch on drive battery pack 3 and recharge battery pack 14. Timer switch 80 will continue to operate in this fashion cycling through all battery packs and then returning to drive battery pack 1 and recharge battery pack 12 to continue the cycle again.

Timer switch 80 is preferably a rotary timing switch with a rotating arm 81 which rotates to sequentially contact ten separate contact points. Each contact point is connected to two relays, one from each battery bank. In the preferred embodiment, timing switch 80 is a ten minute timer so that each battery pack will discharge for approximately one minute and recharge for approximately nine minutes. It is preferable to provide a period of overlap in switching between pairs of battery packs in order to provide a smooth transition. Thus, the ten contacts on the rotary timer switch 80 may be so constructed that rotary arm 81 will overlap between two contact points for a given period of time. The preferred period of overlap is approximately five seconds.

An accessory battery pack 11 may be provided to power vehicle accessories. Accessory battery pack 11 is recharged from generator 101.

A reserve battery pack 22 may be provided in order to replace battery packs which are found to be defective. Reserve battery pack 22 is recharged via generator 112. Relay 51 is connected to reserve battery pack 22 and has contacts which may be connected to the drive or recharge motor and to timer switch 80, respectively. Thus, if during vehicle operation, the operator discovers a defective battery pack, he may disconnect that battery pack from timer switch 80 and its respective electric motor, and then connect reserve battery pack 22 in the vacated timer and electric motor contacts.

Instrument panel 85 may be provided inside the vehicle compartment so that the operator can tell at a glance the charge condition of each battery pack. As shown in FIG. 3, instrument panel 85 is connected to each of the generators 91–112. Like in an internal combustion engine vehicle, when the generator charges the battery the battery must be in a low charge state. Likewise, when the generator is not charging the battery, this is an indication that the battery is completely charged. Thus, the charging/discharging state of the generator is a function of the condition of the battery. Persons of ordinary skill in this field recognize that such indicators may be provided to monitor the state of the battery charge. Thus, the charging or discharging state of any battery pack can oe readily determined. Additionally, instrument panel 85 may contain displays to indicate the operating state of various vehicle accessories (not shown).

In operation, rotary timing switch 80 completes one rotation at ten minute intervals, switching pairs of battery packs on for approximately 60 seconds. Non-connected battery packs are being recharged for approximately nine minutes by recharge motor 70. Thus, the deep cycle phenomenon is avoided and after nine minutes of recharging, each battery pack is recharged nearly to the level of charge immediately prior to the previous discharge phase. Thus, each battery can operate longer without being fully recharged, and each battery's lifetime will be extended. By allowing the battery packs to be recharged from recharge motor 70, the recharging of the batteries is not subject to the vehicle drive conditions or the terrain over which the vehicle operates. Thus, the batteries are subject to specifically timed cycles of discharge and recharge, further lengthening the operational life of the batteries and the range of the vehicle before a full recharge is required.

FIG. 4 depicts an alternative embodiment of the present invention. In this embodiment, electric drive motor 60 has a shaft 62 which is belted to shaft 72 of electric recharge motor 70. In this fashion, the electric motors can share their loads so that the power required to drive the motors may be shared between the bank of drive batteries and the bank of recharge batteries. Such an arrangement also permits excess drive power to be recirculated as recharge power. In the preferred embodiment, each DC electric motor operates at 3,600 rpms and is controlled by a carbon pile rheostat.

Figure 5:
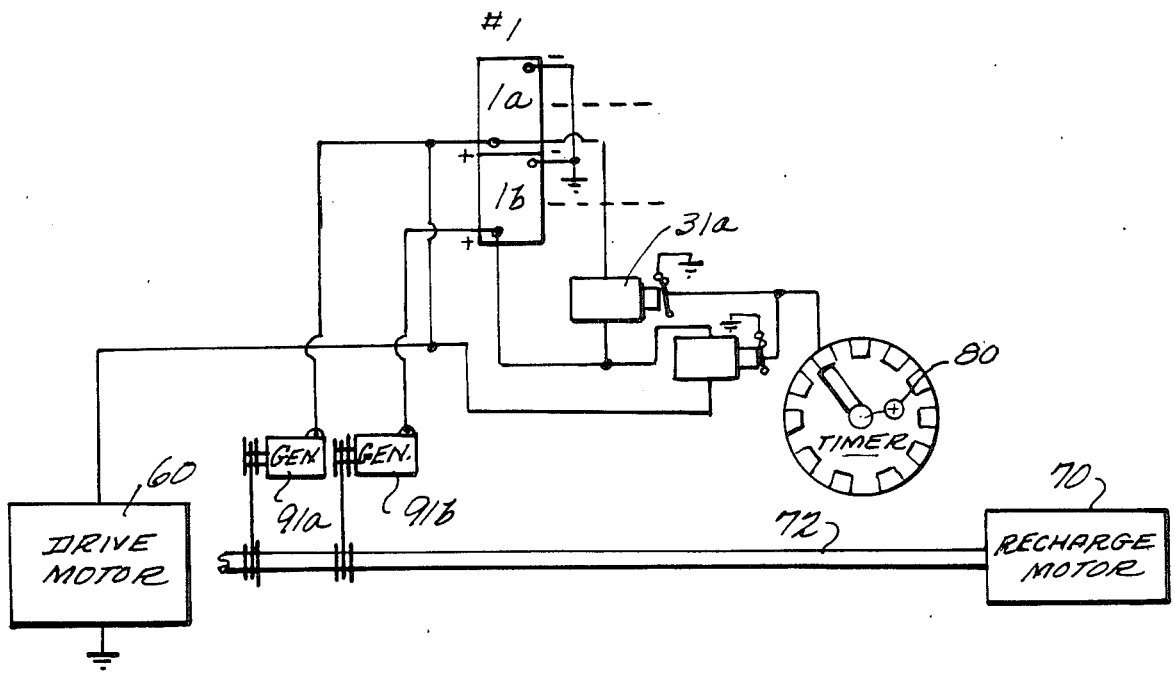
FIG. 5 depicts an alternative embodiment of the present invention in which a separate generator is provided for each battery within a battery pack.

FIG. 5 depicts yet another embodiment of the present invention. In this configuration, each battery in a battery pack is separately recharged with a separate generator and thus, two relays are required to connect the batteries in series and provide power to drive motor 60. As an example of this configuration, FIG. 5 depicts drive battery pack 1 and its ancillary equipment. Battery pack 1 includes battery 1a and battery 1b. Battery 1a may be recharged through generator 91a, and battery 1b may be recharged through generator 91b. To switch the drive power from batteries 1a and 1b to drive motor 60, relays 31a and 31b are required. Both relays 31a and 31b are connected to rotary timing switch 80 and are activated simultaneously. Relay 31a connects the positive terminals of batteries 1a and 1b together. Relay 31b then connects the thus connected positive terminals of battery pack 1 to drive motor 60. By allowing individual recharge of each battery, such a configuration may be beneficial in further extending the operational range and lifetime of each battery.

A further optional device for the present invention is depicted in FIG. 6. The apparatus depicted in FIG. 6 is beneficial in providing auxiliary AC power. An auxiliary shaft 301 is belted to either shaft 72 of recharge motor 70 or shaft 62 of drive motor 60. Preferably, auxiliary shaft 301 is belted so as to have a 6-1 reduction ratio which will provide 600 rpms to the auxiliary shaft. Auxiliary shaft 301 preferably turns ten six cylinder distributors 311-320, through belts, shafts, or known transmission means. During a period where one or both of the electric motors is not in operation, the output of selected generators (91 and 92 in FIG. 6) is switched to the center contact of the six cylinder distributors. As shown for distributor 311, the six outputs of each distributor may be then connected together. As auxiliary shaft 301 rotates at 600 rpm, each distributor will provide 12 volt AC power at 60 cycles per second from the six output contacts. An additional modification would be to provide this 12 volt AC power to a 10-1 up-grade transformer to provide 120 volts of AC power. Thus, the apparatus according to the present invention, when installed in an electric vehicle, may also function as a portable electric generator.

Thus, what has been described is an invention providing apparatus and method for efficiently driving a load so as to extend the life of the batteries and the period of time required between full recharging operations. While this invention has been described in what is presently considered to be the preferred exemplary embodiment, those having ordinary skill in the art will recognize that alternative embodiments may be designed and built which may as effectively carry out the teachings of the claimed invention. For example, rotary timer switch 80 may be implemented by purely electrical switching means. Also, relays 31-51 could be replaced by a centralized switch means for opening and closing contact between each of the battery packs and the corresponding electric motor. Also, each battery pack may comprise one or a plurality of batteries, depending upon the intended use of the vehicle. Likewise, the number of battery packs may be altered in order to specifically tailor the invention to specific vehicle requirements. For instance, a golf cart may only require three pairs of battery packs, while a cargo carrying vehicle may require in excess of twenty pairs of battery packs. These and other modifications are intended to be included within the scope of the appended claims.

What is claimed is:

1. Electric regeneration apparatus for driving a load, comprising:
   first electric motor means adapted for driving said load;
   battery means for providing drive power to said first electric motor means, and for providing recharge power, said battery means including a first plurality of battery packs which provide said drive power, and a second plurality of battery packs which provide said recharge power, each one of said first plurality of battery packs being paired with a corresponding one of said second plurality of battery packs;
   generator means for recharging said battery means;
   second electric motor means for receiving said recharge power and driving said generator means; and
   switching means for switching between pairs of battery packs to cause one of said first plurality of battery pack to provide said drive power while the corresponding battery pack from said second plurality of battery pack provides said recharge power, remaining pairs of battery packs being recharged by said generator means.

2. Apparatus according to claim 1 further including hydraulic drive means, coupled to said first electric motor means, for smoothing drive power applied to said load.

3. Apparatus according to claim 1 wherein said first and second electric motor means are coupled together to equalize loads.

4. Apparatus according to claim 1 further including at least one reserve battery pack which may be connected to either of said first or said second electric motors to replace one or more defective battery packs.

5. Apparatus according to claim 1 further including at least one accessory battery pack to power accessories.

6. Apparatus according to claim 1 further including instrument panel means, coupled to each of said battery packs, for displaying the charge condition of each battery pack.

7. Apparatus according to claim 1 wherein each said battery packs includes two 12 volt DC, 650 amp batteries.

8. Apparatus according to claim 1 wherein said switching means sequentially cycles through all pairs of battery packs, pair-by-pair, to cause each pair to provide power for a predetermined period of time.

9. Apparatus according to claim 8 wherein said switching means provides a period of overlap in switching between pairs so that during said overlap period, two pairs are providing drive and recharge power.

10. Apparatus according to claim 9 wherein said predetermined period of time is approximately 55 seconds, and wherein said period of overlap is approximately equal to 5 seconds.

11. Apparatus according to claim 10 wherein said first and said second plurality of battery packs each include ten battery packs so that each battery pack provides power for approximately 1 minute and is recharged for approximately nine minutes.

12. Apparatus accordng to claim 9 wherein said generator means includes first and second pluralities of generators, each generator in said first plurality of generators being associated with a battery pack in said first plurality of battery packs, and each generator in said second plurality of generators being associated with a battery pack in said second plurality of battery packs.

13. Apparatus according to claim 12 further including relay means, coupled between each said battery pack and its corresponding electric motor means and responsive to said switching means, for opening and closing electrical contact between said battery pack and said corresponding electric motor means.

14. Apparatus according to claim 13 wherein said relay means includes a plurality of relays, each relay associated with one of said battery packs.

15. Apparatus according to claim 13 wherein each battery pack includes two batteries, and wherein one generator is associated with each battery so that each battery is recharged individually.

16. Apparatus according to claim 15 wherein said relay means includes first and second relays, said first relay coupled between said two batteries, and said second relay coupled between said first relay and said corresponding electric motor means.

17. Appratus according to claim 13 further including auxiliary power means, coupled to said generator means and to said second electric motor means, for providing auxiliary AC power, said auxiliary power means including:
   an auxiliary shaft coupled to said second electric motor means;
   a plurality of distributor means, each distributor means receiving input DC power from a different generator and having a plurality of outputs from which AC power may be derived; and
   drive means for driving said plurality of distributor means from said auxiliary shaft.

18. Electric regeneration apparatus for driving a load, comprising:
   electric motor means adapted for driving said load, and for providing recharge energy;
   first battery means for providing drive power to said electric motor means, and for receiving said recharge energy, said first battery means including a first plurality of battery packs;
   second battery means for providing recharge power to said electric motor means, and for receiving said recharge energy, said second battery means including a second plurality of battery packs arranged so that each battery pack of said second plurality of battery packs is paired with a corresponding one of said first plurality of battery packs; and
   switching means for sequentially connecting pairs of battery packs to said electric motor means to cause a battery pack from said first plurality of battery packs to provide said drive power while a corresponding battery pack from said second plurality of battery packs provides said recharge power, remaining pairs of battery packs being recharged with said recharge energy.

19. Apparatus according to claim 18 wherein said switching means provides a period of overlap between successive pairs of battery packs so that during said overlap period two pairs of battery packs are connected to said electric motor means.

20. Apparatus according to claim 18 further including generator means for receiving said recharge energy and recharging said first and said second battery means.

21. Apparatus according to claim 20 wherein said generator means includes a first plurality of generators, each one of which is associated with a corresponding one of said first plurality of battery packs, and a second plurality of generators, each one of which is associated with a corresponding one of said second plurality of battery packs.

22. Apparatus according to claim 21 further including relay means coupled to said first and said second battery means and responsive to said switching means, for opening and closing electrical contact between said battery means and said electric motor means.

23. Apparatus according to claim 22 wherein said relay means includes a first plurality of relays, each relay of which is coupled to a corresponding one of said first plurality of battery packs, and a second plurality of relays, each relay of which is coupled to a corresponding one of said second plurality of battery packs.

24. Apparatus according to claim 23 wherein said electric motor means includes a first electric motor coupled to said first plurality of relays, for driving said load, and a second electric motor coupled to said second plurality of relays, for providing said recharge energy.

25. Apparatus according to claim 24 wherein said first and said second electric motors are coupled together to equalize loads.

26. Appratus according to claim 20 wherein each said battery pack includes two batteries, and wherein said generator means includes one generator coupled to each battery.

27. Apparatus according to claim 26 further including relay means responsive to said switching means, for establishing electrical contact between said battery means and said electric motor means, said relay means including, for each said battery pack, a first relay for coupling together said two batteries, and a second relay for coupling said battery pack to said electric motor means.

28. Apparatus according to claim 20 further including distributor means, coupled to said electric motor means, for providing auxiliary AC power, said distributor means including a plurality of distributors, each one of which receives energy from said generator means and providing a plurality of outputs from which said AC power is derived.

29. Apparatus according to claim 18 further including accessory battery pack means for providing power to accessories.

30. Apparatus according to claim 18 further including reserve battery pack means for providing reserve power to said electric motor means.

31. Apparatus according to claim 18 further including instrument panel means, coupled to said first and second battery means, for displaying an electrical condition of said battery means.

32. Apparatus according to claim 18 further including hydraulic drive means, coupled to said electric motor means, for smoothing force applied to said load.

33. Apparatus according to claim 18 wherein each battery pack includes two, twelve volt DC batteries coupled in series.

34. Apparatus according to claim 33 wherein said first and said second plurality of battery packs each include ten battery packs.

35. Electrical regeneration apparatus for driving an electrical automobile, comprising:
   electrical drive motor means adapted to drive said automobile;
   a first plurality of battery means for providing drive power to said drive motor means;
   a second plurality of battery means, arranged with said first plurality of battery means in pairs, for providing recharging power;
   generator means for recharging said first and second plurality of battery means;
   electrical recharge motor means for receiving said recharging power and driving said generator means; and
   control means for switching between said pairs to cause one of said first plurality of battery means to power said drive motor means while a corresponding one of said second plurality of means sequentially switching through all pairs of battery means, pair-by-pair, while all pairs not providing power are recharged by said generator means.

36. Apparatus according to claim 35 wherein said control means includes:
   timer switch means for switching between said pairs of battery means at given intervals of time; and relay means, responsive to said timer switch means, for opening and closing electrical contact between said battery means and said electrical drive motor means.

37. Appratus according to claim 36 wherein said timer switch means provides a period of overlap between adjacent time intervals during which two pairs of battery means are connected to said electrical drive motor means and said electrical recharge motor means to cause said switching to be smooth.

38. A method of powering an electrical car having a electric drive motor, an electric recharge motor, first and second pluralities of battery packs, and generators connected to said recharge motor and to said battery packs, comprising the steps of:

selecting a first pair of battery packs including a first battery pack from said first plurality of battery packs and a second battery pack from said second plurality of battery packs;

connecting said first battery pack to said electric drive motor, and said second battery pack to said electric recharge motor for a predetermined period of time;

recharging non-connected pairs of battery packs from said generators and said electric recharge motor;

disconnecting said first pair of battery packs from said electric motors, and connecting a second pair of battery packs to said electric motors, said first pair of battery packs being recharged with other non-connected pairs of battery packs; and sequentially repeating said disconnecting and connecting step for all pairs of battery packs.

39. A method according to claim 38 wherein said first pair of battery packs is not disconnected until a predetermined interval of time after said second pair of battery packs is connected, said predetermined interval of time being shorter than said predetermined period of time.

40. A method according to claim 39 wherein said predetermined period of time is approximately one minute, and said predetermined interval of time is approximately five seconds.

* * * * *